(12) United States Patent
Yamada et al.

(10) Patent No.: US 9,039,094 B2
(45) Date of Patent: May 26, 2015

(54) SEAT FRAME FOR VEHICLE

(75) Inventors: Yukifumi Yamada, Toyota (JP); Naoki Goto, Tokai (JP)

(73) Assignee: AISIN SEIKI KABUSHIKI KAISHA, Kariya-shi (JP)

( * ) Notice: Subject to any disclaimer, the term of this patent is extended or adjusted under 35 U.S.C. 154(b) by 136 days.

(21) Appl. No.: 13/883,305

(22) PCT Filed: Nov. 4, 2011

(86) PCT No.: PCT/JP2011/075430
§ 371 (c)(1),
(2), (4) Date: May 3, 2013

(87) PCT Pub. No.: WO2012/060440
PCT Pub. Date: May 10, 2012

(65) Prior Publication Data
US 2013/0221725 A1    Aug. 29, 2013

(30) Foreign Application Priority Data

Nov. 5, 2010    (JP) .................................. 2010-248561

(51) Int. Cl.
*A47C 7/02* (2006.01)
*B60N 2/68* (2006.01)
(Continued)

(52) U.S. Cl.
CPC ................. *B60N 2/688* (2013.01); *B60N 2/643* (2013.01); *B60N 2/4885* (2013.01); *B60N 2/682* (2013.01)

(58) Field of Classification Search
CPC ............ B60N 2/688; B60N 2/24; B60N 2/64; B60N 2/20; B60N 2/42745; B60N 2/643; B60N 2/72; B60N 3/02; B60N 3/063; B60N 2/4885

USPC .......... 297/452.18, 354.1, 483, 216.13, 452.2, 297/452.22, 452.19
See application file for complete search history.

(56) References Cited

U.S. PATENT DOCUMENTS 4,804,226 A    2/1989    Schmale
5,645,316 A *  7/1997    Aufrere et al. ........... 297/216.13
(Continued)

FOREIGN PATENT DOCUMENTS

JP    63 28751      2/1988
JP    9-254689      9/1997
(Continued)

OTHER PUBLICATIONS

Office Action issued Sep. 2, 2014 in Japanese Patent Application No. 2010-248561 (with partial English translation).

(Continued)

*Primary Examiner* — Chi Q Nguyen
(74) *Attorney, Agent, or Firm* — Oblon, McClelland, Maier & Neustadt, L.L.P.

(57) ABSTRACT

A seat back frame includes: a first side member and a second side member each formed into an elongated shape along an up-and-down direction of a seat back so as to support each side portion of the seat back; and a belt guide portion on which tension of a seat belt is applied when the seat belt is pulled, the belt guide portion being formed in an upper portion of the first side member and guiding the seat belt having the one end retained by a seat belt retaining member. The first side member is formed of a sheet of steel plate and includes: a side member side wall portion formed in parallel to a direction of application of the tension of the seat belt on the belt guide portion and formed continuously along a longitudinal direction of the first side member; a side member front wall portion formed on a front side of the vehicle with respect to the side member side wall portion; and a side member rear wall portion formed on a rear side of the vehicle with respect to the side member side wall portion, the first side member having an open cross-sectional shape.

10 Claims, 11 Drawing Sheets

(51) Int. Cl.
  *B60N 2/64*  (2006.01)
  *B60N 2/48*  (2006.01)

(56) References Cited

U.S. PATENT DOCUMENTS

| | | | | |
|---|---|---|---|---|
| 5,722,731 | A * | 3/1998 | Chang | 297/473 |
| 5,918,943 | A * | 7/1999 | Mitschelen et al. | 297/452.18 |
| 6,082,823 | A | 7/2000 | Aumont et al. | |
| 6,375,267 | B1 * | 4/2002 | Ishikawa | 297/452.18 |
| 6,767,055 | B1 * | 7/2004 | Sparks | 297/216.14 |
| 6,817,672 | B2 * | 11/2004 | Matsunuma | 297/452.18 |
| 6,869,145 | B2 * | 3/2005 | Matsunuma | 297/452.18 |
| 7,497,521 | B2 * | 3/2009 | Whalen et al. | 297/468 |
| 7,731,292 | B2 * | 6/2010 | Ishijima et al. | 297/452.18 |
| 7,887,139 | B2 | 2/2011 | Yamada et al. | |
| 8,523,284 | B2 * | 9/2013 | Yamada et al. | 297/452.18 |
| 2002/0135222 | A1 * | 9/2002 | Matsunuma | 297/483 |
| 2011/0154738 | A1 | 6/2011 | Suzuki | |
| 2012/0217775 | A1 * | 8/2012 | Fujita et al. | 297/216.13 |
| 2012/0306253 | A1 * | 12/2012 | Seibold et al. | 297/354.1 |

FOREIGN PATENT DOCUMENTS

| | | |
|---|---|---|
| JP | 11 321412 | 11/1999 |
| JP | 2002 283892 | 10/2002 |
| JP | 2002-283893 | 10/2002 |
| JP | 2005 145168 | 6/2005 |

OTHER PUBLICATIONS

International Search Report Issued Dec. 6, 2011 in PCT/JP11/75430 Filed Nov. 4, 2011.

* cited by examiner

SEAT FRAME FOR VEHICLE

TECHNICAL FIELD

The present invention relates to a seat frame for a vehicle.

BACKGROUND ART

There is known a seat frame including: a seat cushion frame for supporting a seat cushion of a seat of a vehicle; and a seat back frame to which a retractor (seat belt retaining member) is coupled, the seat back frame being coupled to the seat cushion frame, and supporting a seat back of the seat. Patent Literature 1 discloses a seat back frame including: a pipe frame extending along a contour of a seat back; and a tower frame provided so as to extend in an up-and-down direction of a vehicle. To an upper portion of the tower frame of the seat back frame, a belt guide portion is mounted. The belt guide portion guides a shoulder belt for holding a shoulder portion of an occupant. Further, a bracket is fixed to a lower pipe (lower cross member) formed on an inner side of a lower portion of the tower frame, and a retractor (seat belt retaining member) for winding a seat belt is fixed to the bracket.

CITATION LIST

Patent Literature

[PTL 1] JP 2002-283892 A

SUMMARY OF INVENTION

Technical Problems

The tower frame of the seat frame described in Patent Literature 1 includes: an outer wall member shaped into a rectangular column and including an outer side bracket and an inner side bracket; and an insert brace provided inside the outer wall member. Both the brackets and the insert brace are partially connected together by welding. The insert brace reinforces the tower frame.

Tension of the seat belt is applied to the seat back frame to which the retractor is mounted, and hence the seat back frame is reinforced as needed in order to obtain rigidity commensurate to the tension. In Patent Literature 1 above, the tower frame forming the seat back frame is reinforced by the insert brace. However, the insert brace is not designed in consideration of a direction of tension that the seat back frame receives from the seat belt. Therefore, rigidity of the seat back frame with respect to the tension of the seat belt is not greatly increased. Further, the tower frame is formed of three sheets of steel plates (outer side bracket, inner side bracket, and insert brace), and the three sheets of steel plates are partially joined together at certain intervals by spot welding. Accordingly, the tower frame is more likely to buckle and deform in a portion between joining points. In addition, the number of components is increased and man-hours for welding are increased, which leads to increase in cost.

The present invention has been made in order to solve the above-mentioned problems, and has an object to provide a seat frame including a seat back frame having a relatively simple configuration and having increased rigidity with respect to the tension of the seat belt.

Solution to Problem

According to the present invention, there is provided a seat frame, including: a seat cushion frame for supporting a seat cushion of a seat of a vehicle; and a seat back frame to which a seat belt retaining member is coupled, the seat back frame being coupled to the seat cushion frame and supporting a seat back of the seat, the seat belt retaining member retaining one end of a seat belt for holding an occupant seated on the seat. The seat back frame includes: a first side member and a second side member each formed into an elongated shape along an up-and-down direction of the seat back so as to support each side portion of the seat back; and a belt guide portion on which tension of the seat belt is applied when the seat belt is pulled, the belt guide portion being formed in an upper portion of the first side member and guiding the seat belt having the one end retained by the seat belt retaining member. The first side member is formed of one sheet of steel plate, and includes: a side member side wall portion formed in parallel to a direction of application of the tension of the seat belt on the belt guide portion and formed continuously along a longitudinal direction of the first side member; a side member front wall portion formed on a front side of the vehicle with respect to the side member side wall portion; and a side member rear wall portion formed on a rear side of the vehicle with respect to the side member side wall portion, the first side member having an open cross-sectional shape.

According to the present invention, the belt guide portion is formed in the upper portion of the first side member. The belt guide portion guides the seat belt, and receives the tension of the seat belt when the seat belt is pulled. Further, the first side member includes the side member side wall portion, the side member front wall portion, and the side member rear wall portion. The side member side wall portion is formed along the longitudinal direction of the first side member. Further, the side member side wall portion is formed in parallel to the direction of application of the tension of the seat belt on the belt guide portion. Therefore, when the tension of the seat belt is applied onto the belt guide portion, the side member side wall portion effectively functions as a reinforcing portion against the tension. Accordingly, it is possible to provide the seat frame including the seat back frame having increased rigidity with respect to the tension of the seat belt.

Further, the first side member is formed of one sheet of steel plate. Accordingly, the number of components is reduced, and thus it is possible to reduce a manufacturing cost of the seat frame. In addition, the first side member has the open cross-sectional shape, and it is unnecessary to weld a plurality of sheets of steel plate together so as to form a closed cross-section. As a result, man-hours for working such as welding are reduced. Accordingly, it is possible to further reduce the manufacturing cost of the seat frame. Note that, the open cross-sectional shape means an unclosed cross-sectional shape.

In this case, it is preferred that the first side member and the belt guide portion be integrally molded from one sheet of steel plate. In this way, it is possible to further reduce the manufacturing cost of the seat frame.

Further, it is preferred that the side member front wall portion include a front projecting portion projecting to an outer side of the seat back with respect to the side member side wall portion, and the side member rear wall portion include a rear projecting portion projecting to the outer side of the seat back with respect to the side member side wall portion. It is preferred that the front projecting portion and the rear projecting portion be formed continuously along the longitudinal direction of the first side member, and the front projecting portion have a projecting amount larger than a projecting amount of the rear projecting portion.

With this, the front projecting portion forms a ridge formed on the front side of the vehicle with respect to the side member side wall portion along the longitudinal direction of the first side member, and the rear projecting portion forms a ridge formed on the rear side of the vehicle with respect to the side member side wall portion along the longitudinal direction of the first side member. The ridge (front projecting portion), which is formed on the front side of the vehicle with respect to the side member side wall portion, prevents the first side member from buckling and deforming when the first side member is pulled to the front side of the vehicle. The ridge (rear projecting portion), which is formed on the rear side of the vehicle with respect to the side member side wall portion, prevents the first side member from buckling and deforming when the first side member is pulled to the rear side of the vehicle. Further, the front projecting portion has the projecting amount larger than the projecting amount of the rear projecting portion. Therefore, when the first side member is pulled to the front side of the vehicle by a large force, for example, at the time of sudden braking of the vehicle, the first side member is more effectively prevented from buckling and deforming.

Further, it is preferred that the belt guide portion include: a belt guide side wall portion formed in parallel to the direction of application of the tension of the seat belt on the belt guide portion; a belt guide front wall portion formed on the front side of the vehicle with respect to the belt guide side wall portion so as to extend to an inner side of the seat back; and a belt guide rear wall portion formed on the rear side of the vehicle with respect to the belt guide side wall portion so as to extend to the inner side of the seat back. With this, also the belt guide portion, which is formed in the upper portion of the first side member, includes the belt guide side wall portion formed in parallel to the direction of application of the tension of the seat belt. Accordingly, rigidity with respect to the tension of the seat belt is further increased.

Further, it is preferred that the belt guide front wall portion and the belt guide rear wall portion each include a portion orthogonal to the direction of application of the tension of the seat belt on the belt guide portion. With this, the belt guide front wall portion and the belt guide rear wall portion are formed in a direction orthogonal to the direction of application of the tension of the seat belt on the belt guide portion, and hence the seat belt is prevented from slipping off when the seat belt is hung over the belt guide portion. Accordingly, the tension of the seat belt is correctly applied in a direction of formation of the belt guide side wall portion.

Further, it is preferred that the first side member be produced by die quenching. That is, it is preferred that the first side member be molded in a die assembly and quenched in the die assembly through contact with dies. In this way, the first side member including the side member side wall portion, the side member front wall portion, and the side member rear wall portion can be molded from one sheet of steel plate by, for example, pressing. Further, the first side member molded in the die assembly is quenched and hardened through contact with the dies, and thus it is possible to increase strength of the first side member. Note that, in this case, the first side member and the belt guide portion are integrally molded by die quenching, and thus it is possible to further reduce the manufacturing cost.

Further, it is preferred that the seat back frame include a cross member for coupling the first side member and the second side member together. Further, it is preferred that the cross member be set to have a vertical length larger than a widthwise length thereof in cross-section. With this, the cross member has a vertically elongated shape in cross-section, and hence also a recess, which is formed in the first side member in order to fix the cross member, is formed into a vertically elongated shape. As described above, the recess formed in the first side member can be formed into a vertically elongated shape, and thus an area of the recess formed in the first side member is correspondingly reduced. Consequently, the cross member can be supported by the first side member while preventing reduction in strength of the first side member that is accompanied with formation of the recess. In this case, it is preferred that the seat belt retaining member be mounted to the cross member.

DESCRIPTION OF EMBODIMENT

Figure 1:
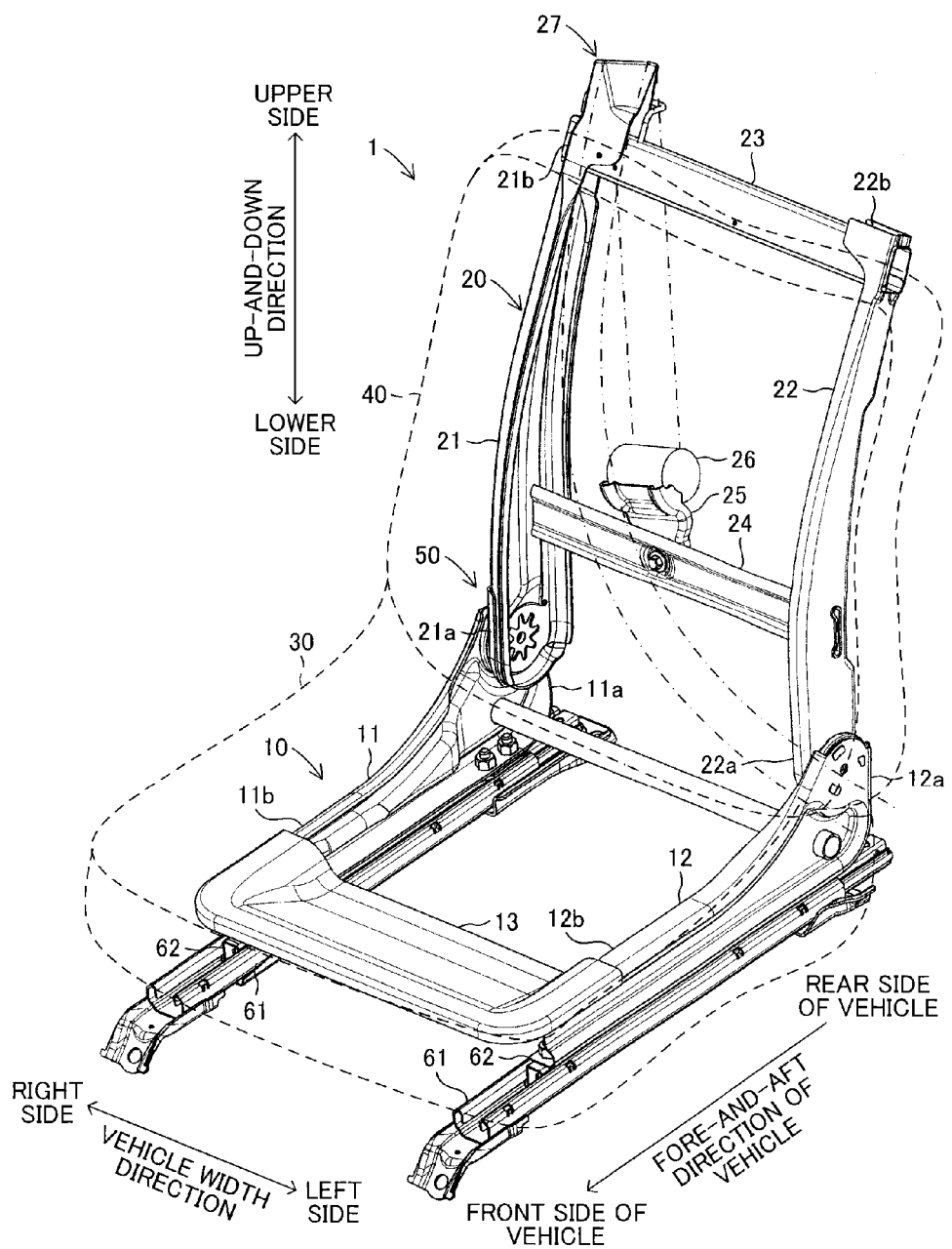
FIG. 1 is a perspective view of a seat frame according to an embodiment of the present invention.
Figure 2:
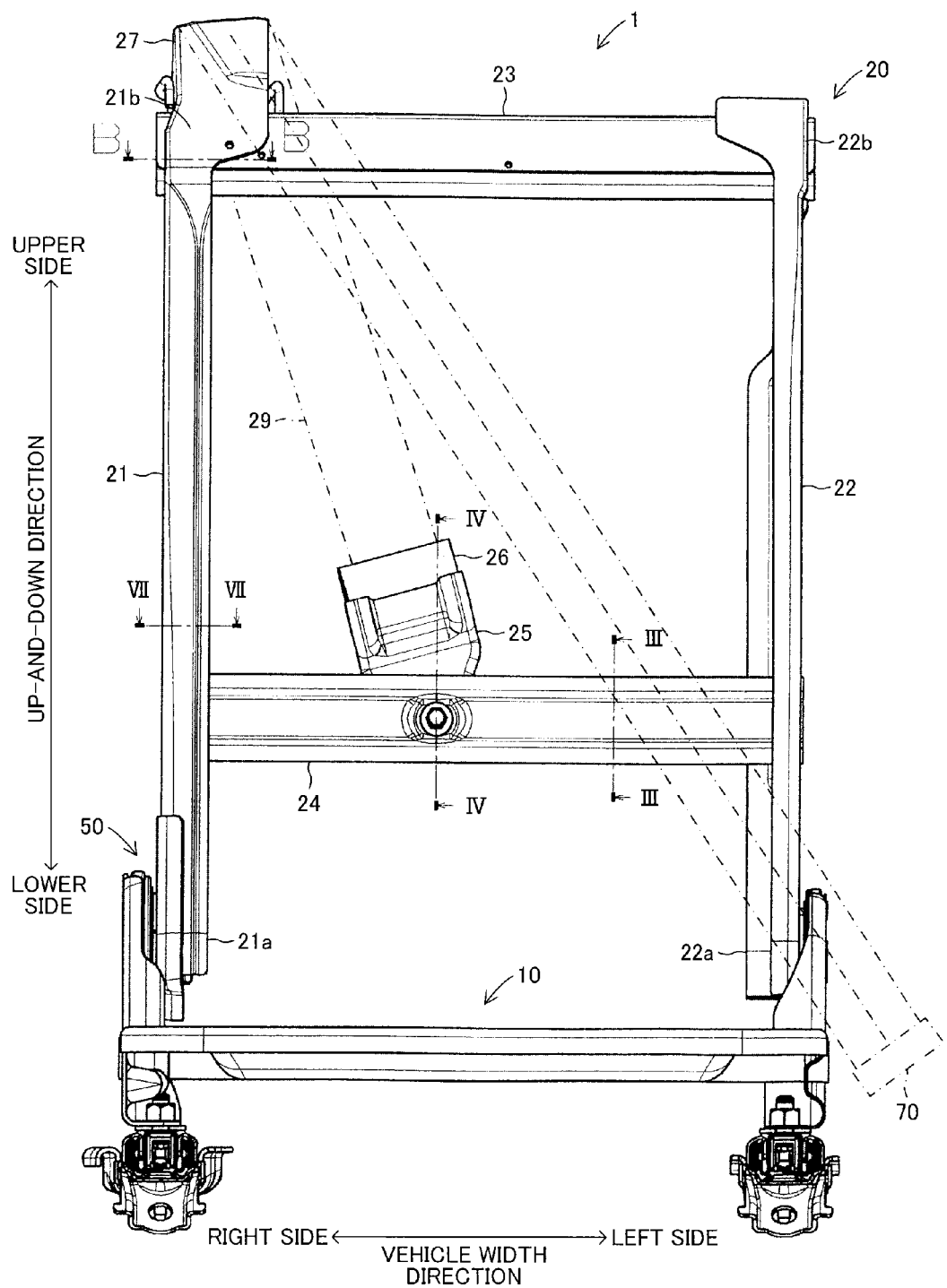
FIG. 2 is a front view of the seat frame according to the embodiment of the present invention.

In the following, an embodiment of the present invention is described. FIG. 1 is a perspective view of a seat frame according to this embodiment, and FIG. 2 is a front view of the seat frame. As illustrated in FIGS. 1 and 2, a seat frame 1 according to this embodiment includes a seat cushion frame 10 and a seat back frame 20. The seat cushion frame 10 supports a seat cushion 30 serving as a portion to be seated of a seat of a vehicle. The seat back frame 20 supports a seat back 40 serving as a backrest portion of the seat of the vehicle. The seat back frame 20 is swingably coupled to the seat cushion frame 10 through the intermediation of a recliner 50.

The seat cushion frame 10 includes a seat cushion right-hand side member 11, a seat cushion left-hand side member 12, and a coupling member 13. The seat cushion right-hand side member 11 is arranged under a right-hand side portion of the seat cushion 30, and the seat cushion left-hand side member 12 is arranged under a left-hand side portion of the seat cushion 30. Note that, in this specification, a right-and-left direction corresponds to a direction viewed from an occupant who is seated on the seat of the vehicle.

The seat cushion right-hand side member 11 is formed into an elongated shape along a fore-and-aft direction of the vehicle. The seat cushion right-hand side member 11 is coupled at its proximal end portion 11a to a seat back right-hand side member 21 described later through the intermediation of the recliner 50. Also the seat cushion left-hand side member 12 is formed into an elongated shape along the fore-and-aft direction of the vehicle. The seat cushion left-hand side member 12 is coupled at its proximal end portion 12a to a seat back left-hand side member 22 described later. The coupling member 13 couples a distal end portion 11b of the seat cushion right-hand side member 11 and a distal end portion 12b of the seat cushion left-hand side member 12 together. Note that, rail guide members 62, 62, which are fitted respectively onto seat rails 61, 61 formed along the fore-and-aft direction of the vehicle, are connected to a lower surface of the seat cushion right-hand side member 11 and a lower surface of the seat cushion left-hand side member 12, respectively. Therefore, the rail guide members 62, 62 move along the seat rails 61, 61, and thus a position of the seat frame 1 is adjusted in its fore-and-aft direction.

The seat back frame 20 includes the seat back right-hand side member 21, the seat back left-hand side member 22, an upper cross member 23, and a lower cross member 24. The seat back right-hand side member 21 supports the right-hand side portion of the seat back 40, and the seat back left-hand side member 22 supports the left-hand side portion of the seat back 40. The side members 21, 22 are each formed into an elongated shape along an up-and-down direction of the seat back 40. The seat back right-hand side member 21 is coupled to the proximal end portion 11a of the seat cushion right-hand side member 11 through the intermediation of the recliner 50 at a recliner fixing portion 21a formed at a lower end portion of the seat back right-hand side member 21. The seat back left-hand side member 22 is coupled at its lower end portion 22a to the proximal end portion 12a of the seat cushion left-hand side member 12. The upper cross member 23 extends in a vehicle width direction, and couples an upper end portion 21b of the seat back right-hand side member 21 and an upper end portion 22b of the seat back left-hand side member 22 together. Also the lower cross member 24 extends in the vehicle width direction, and couples a slightly lower portion of the seat back right-hand side member 21 and a slightly lower portion of the seat back left-hand side member 22 together.

Figure 3:
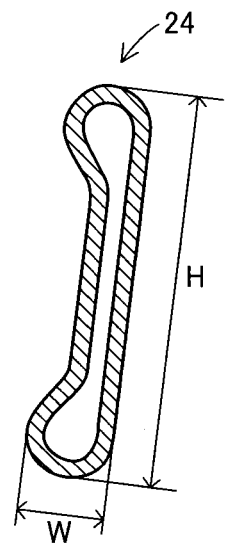
FIG. 3 is a cross-sectional view taken along the line III-III of FIG. 2.

FIG. 3 is a cross-sectional view taken along the line III-III of FIG. 2, that is, a cross-sectional view of the lower cross member 24. As illustrated in FIG. 3, the lower cross member 24 is a hollow member. The lower cross member 24 can be processed, for example, by squeezing a pipe having a circular cross-section. The lower cross member 24 has a cross-section elongated in the up-and-down direction, and has such a shape that circular portions are formed respectively at both end portions in the up-and-down direction of the lower cross member 24 so as to be connected to each other by parallel straight portions. The lower cross member 24 has a vertical length H larger than a widthwise length W thereof.

Figure 4:
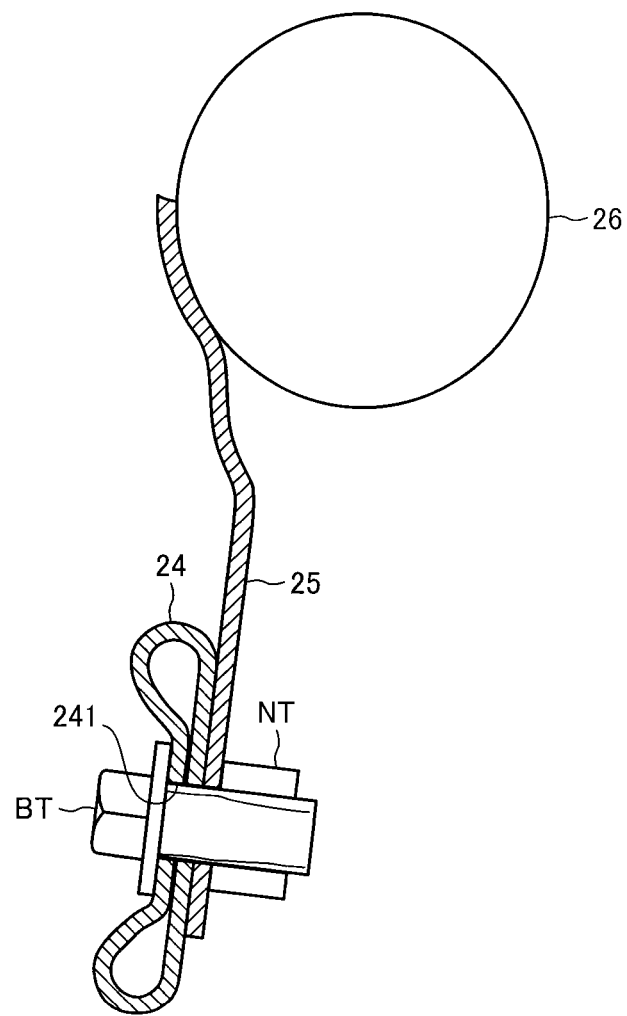
FIG. 4 is a cross-sectional view taken along the line IV-IV of FIG. 2.

FIG. 4 is a cross-sectional view taken along the line IV-IV of FIG. 2. As illustrated in FIG. 4, in the lower cross member 24, a bolt insertion hole 241 passing through the lower cross member 24 in its width direction is formed. A bolt BT is inserted through the bolt insertion hole 241. The bolt BT and a nut NT threadingly engaged with the bolt BT fix a bracket 25 to the lower cross member 24. A retractor (seat belt retaining member) 26 is fixed to a distal end of the bracket 25. That is, the retractor 26 is fixed to the lower cross member 24 through the intermediation of the bracket 25. The retractor 26 retains one end of a seat belt. Further, the retractor 26 may wind the seat belt in a case where predetermined tension is applied from the seat belt.

Figure 5:
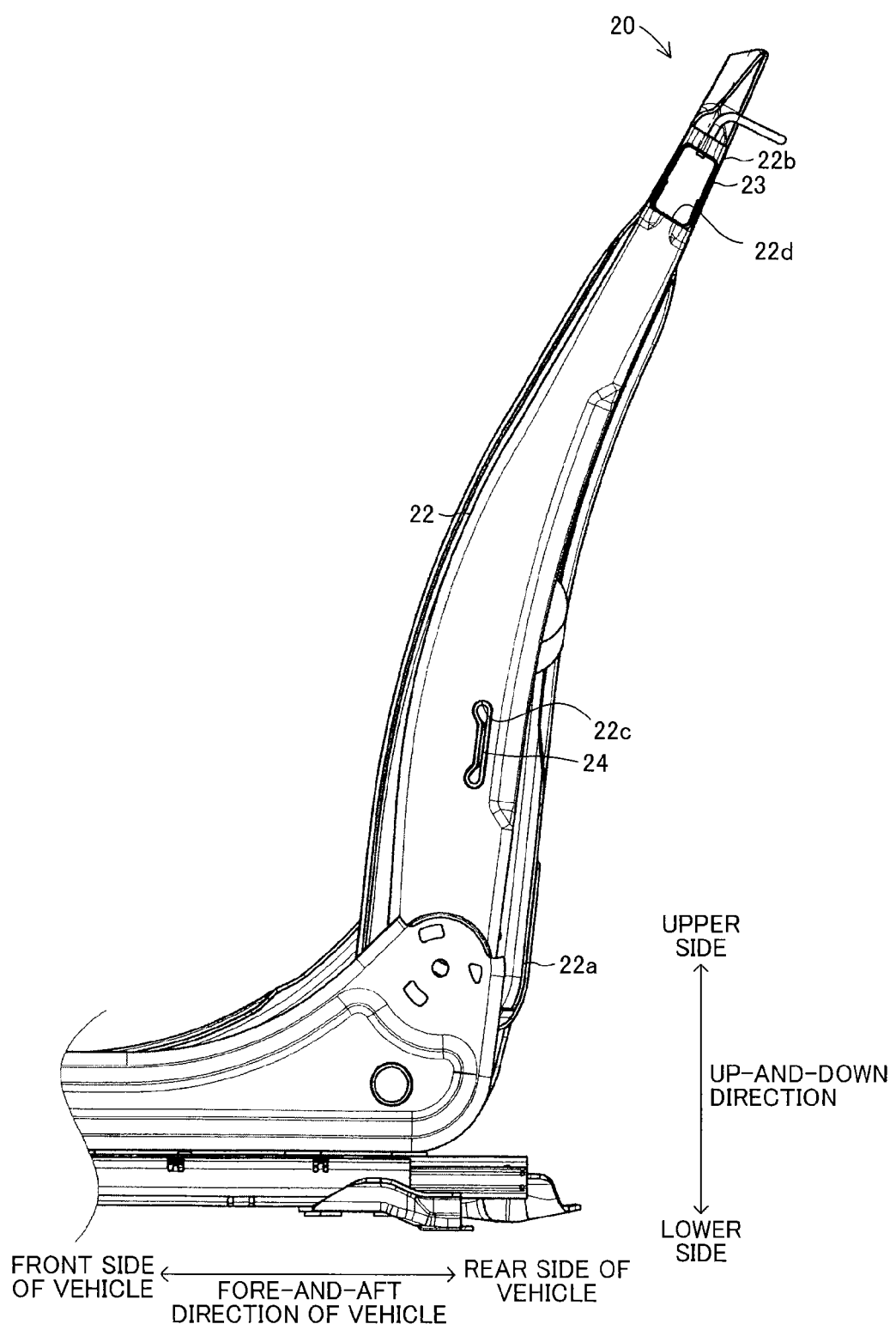
FIG. 5 is a left-hand side view of a seat back frame.

FIG. 5 is a left-hand side view of the seat back frame 20. As illustrated in FIG. 5, the seat back left-hand side member 22 becomes narrower as extending upward and is warped rearward in side view. Further, a first recess 22c and a second recess 22d are formed in the seat back left-hand side member 22. In the first recess 22c, one end of the lower cross member 24 is inserted, and in the second recess 22d, one end of the upper cross member 23 is inserted. The first recess 22c has the same shape as a cross-section of a contour of the lower cross member 24, and the second recess 22d has the same shape as a cross-section of a contour of the upper cross member 23. According to this embodiment, the upper cross member 23 has substantially a rectangular cross-sectional shape.

Further, as is apparent from FIGS. 1 and 2, in an upper portion of the seat back right-hand side member 21, a belt guide portion 27 is formed. The belt guide portion 27 guides a seat belt 29 retained by the retractor 26 at one end. The seat belt 29 is hung over the belt guide portion 27. A tongue plate (not shown) is provided at an intermediate portion of the seat belt 29 which is hung over the belt guide portion 27, and the tongue plate is fixed to a buckle 70 provided below the seat back left-hand side member 22 (see FIG. 2). Note that, another end of the seat belt 29 is fixed to an anchor plate (not shown) provided below the seat back right-hand side member 21. Therefore, the occupant is held from a right shoulder side to a left lower back side by a part of the seat belt stretching between the belt guide portion 27 and the buckle 70 (tongue plate).

Figure 6:
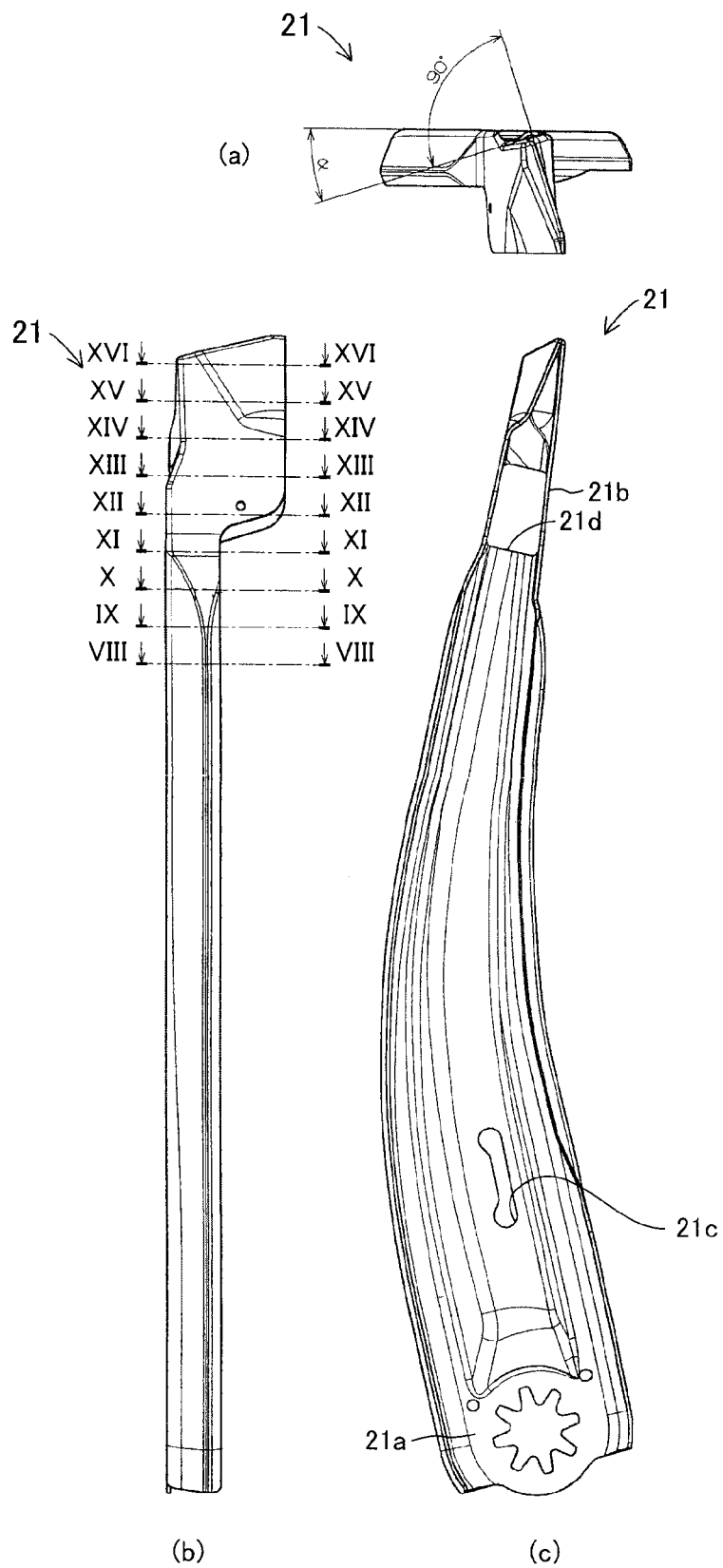
FIG. 6 are views illustrating a seat back right-hand side member and a belt guide portion.

FIG. 6 are views illustrating the seat back right-hand side member 21 and the belt guide portion 27. FIG. 6(a) is a top view of the seat back right-hand side member 21 and the belt guide portion 27, FIG. 6(b) is a front view thereof, and FIG. 6(c) is a right-hand side view thereof. As illustrated in FIG. 6(c), similarly to the seat back left-hand side member 22, also the seat back right-hand side member 21 becomes narrower as extending upward and is warped rearward in side view. Further, a first recess 21c and a second recess 21d are formed in the seat back right-hand side member 21. In the first recess 21c, another end of the lower cross member 24 is inserted, and in the second recess 21d, another end of the upper cross member 23 is inserted. The first recess 21c formed in the seat back right-hand side member 21 and the first recess 22c formed in the seat back left-hand side member 22 have the same shape. The first recesses 21c, 22c support the lower cross member 24. The second recess 21d formed in the seat back right-hand side member 21 and the second recess 22d formed in the seat back left-hand side member 22 have the same shape. The second recesses 21d, 22d support the upper cross member 23.

As is apparent from FIG. 6(c), the recliner fixing portion 21a is formed at a lowermost portion of the seat back right-hand side member 21. The recliner 50 is fixed to the recliner fixing portion 21a. The recliner 50 adjusts an angle of the seat back frame 20 with respect to the seat cushion frame 10. A configuration of the recliner 50 is well-known, and hence description thereof is omitted.

Figure 7:
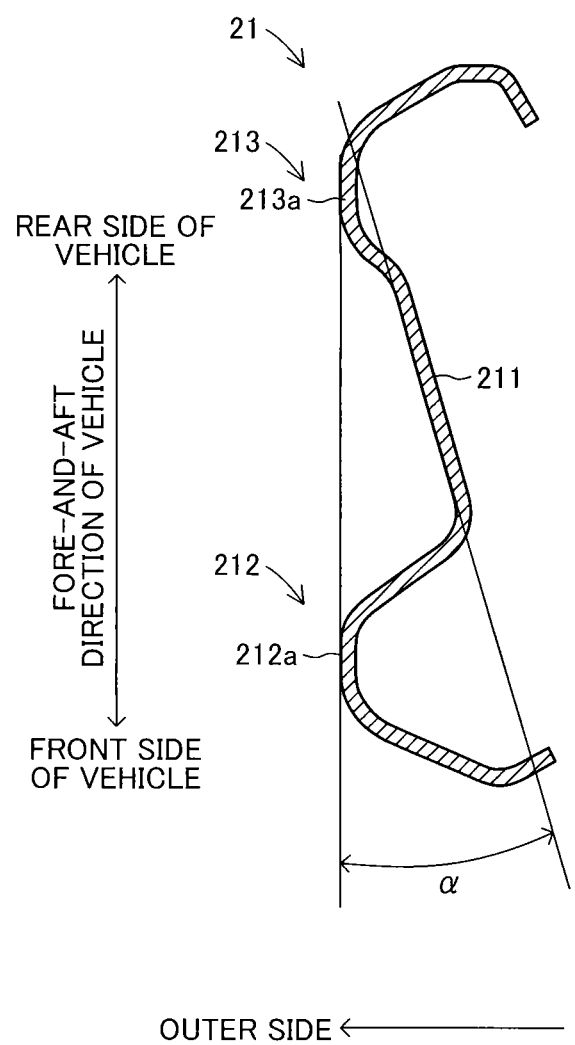
FIG. 7 is a cross-sectional view taken along the line VII-VII of FIG. 2.
Figure 8:
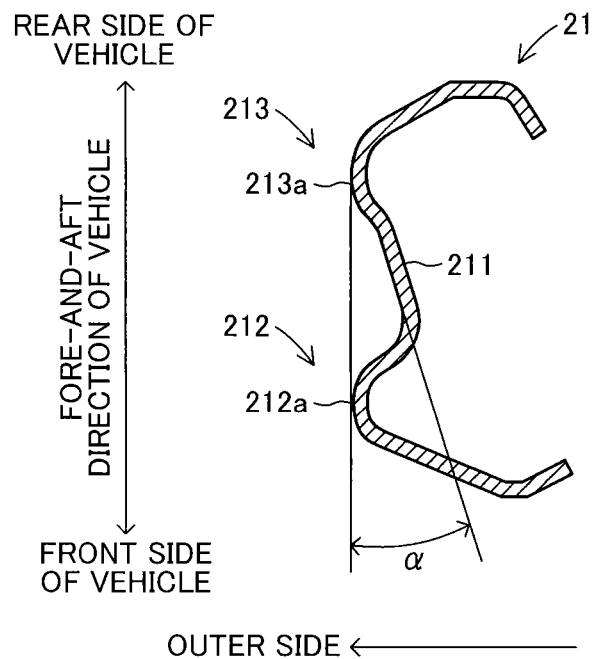
FIG. 8 is a cross-sectional view taken along the line VIII-VIII of FIG. 6.
Figure 9:
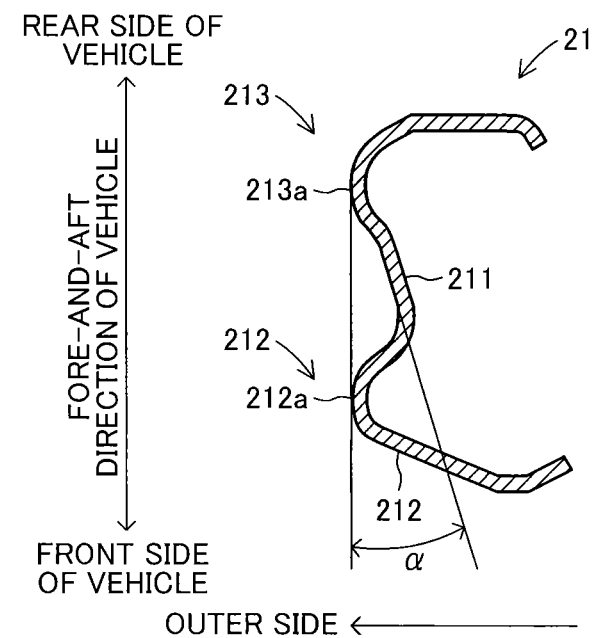
FIG. 9 is a cross-sectional view taken along the line IX-IX of FIG. 6.
Figure 10:
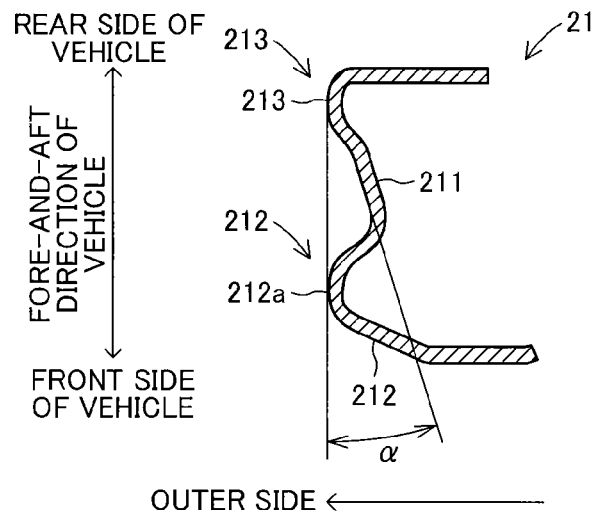
FIG. 10 is a cross-sectional view taken along the line X-X of FIG. 6.
Figure 11:
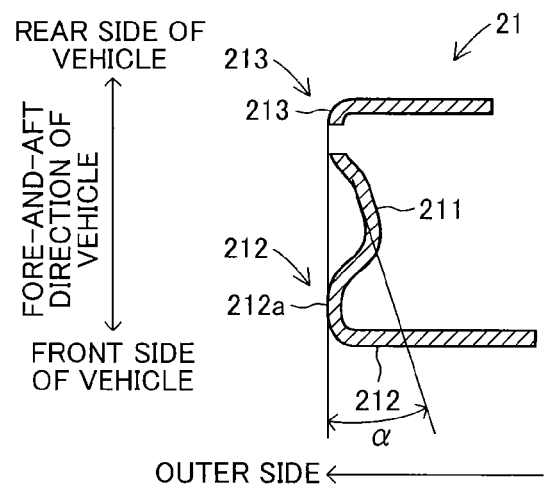
FIG. 11 is a cross-sectional view taken along the line XI-XI of FIG. 6.
Figure 12:
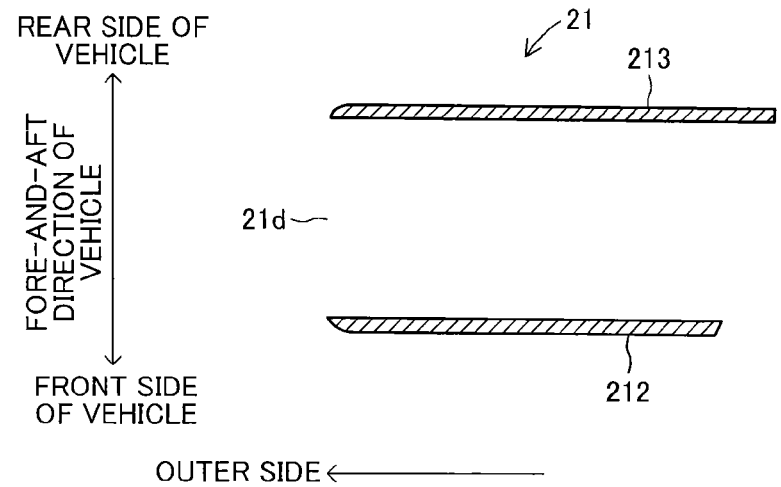
FIG. 12 is a cross-sectional view taken along the line XII-XII of FIG. 6.
Figure 13:
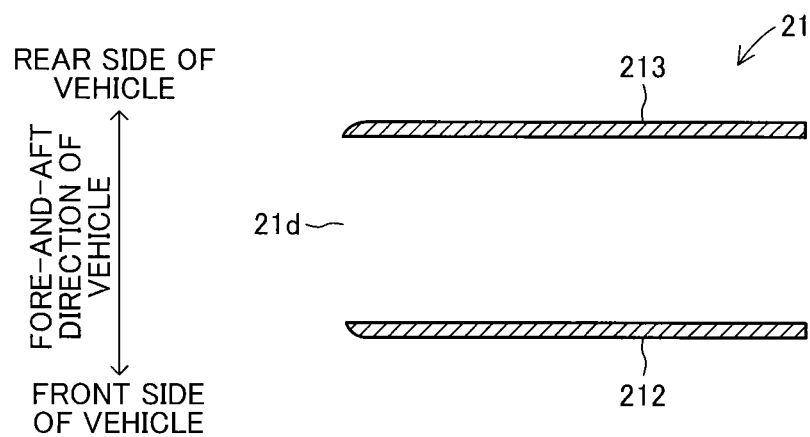
FIG. 13 is a cross-sectional view taken along the line XIII-XIII of FIG. 6.

FIG. 7 is a cross-sectional view taken along the line VII-VII of FIG. 2. FIG. 7 illustrates a cross-sectional shape of the seat back right-hand side member 21 in a vicinity of a center in a longitudinal direction thereof. As illustrated in FIG. 7, the seat back right-hand side member 21 includes: a side member side wall portion 211 formed into a straight portion at substantially a center portion thereof in the fore-and-aft direction of the vehicle; a side member front wall portion 212 formed on a front side of the vehicle (lower side of FIG. 7) with respect to the straight portion; and a side member rear wall portion 213 formed on a rear side of the vehicle (upper side of FIG. 7) with respect to the straight portion. As illustrated in FIG. 7, the side member side wall portion 211 is inclined at an angle α with respect to the fore-and-aft direction of the vehicle. Specifically, the side member side wall portion 211 is inclined at the angle α with respect to the fore-and-aft direction of the vehicle so as to be inclined inward from an outer side of the vehicle as extending from the rear side of the vehicle to the front side of the vehicle.

Further, the side member front wall portion 212 includes a front projecting portion 212a projecting outward (to the outer side of the seat back 40: left side of FIG. 7) with respect to the side member side wall portion 211. Similarly, the side member rear wall portion 213 includes a rear projecting portion 213a projecting outward with respect to the side member side wall portion 211. As is apparent from FIG. 7, the front projecting portion 212a has a projecting amount larger than a projecting amount of the rear projecting portion 213a.

Figure 14:
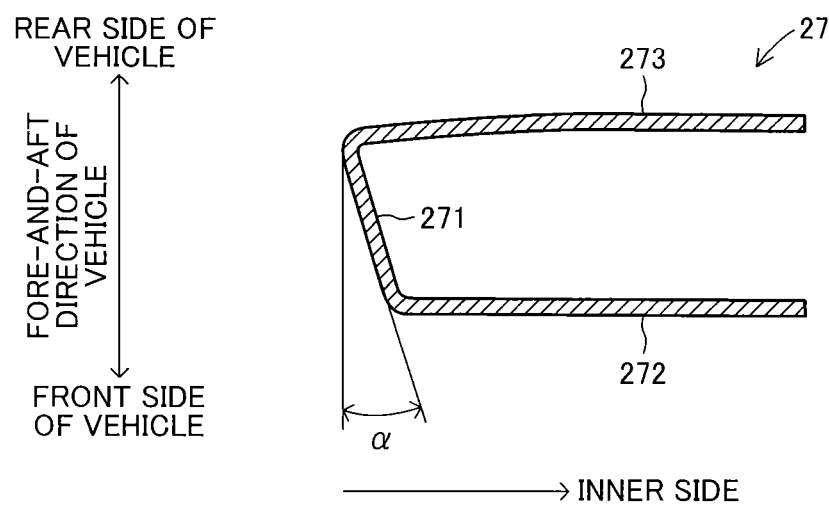
FIG. 14 is a cross-sectional view taken along the line XIV-XIV of FIG. 6.
Figure 15:
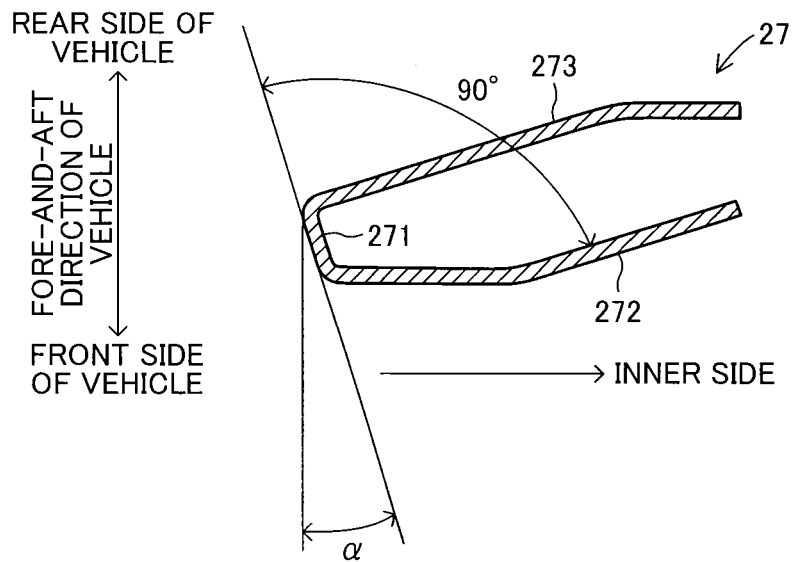
FIG. 15 is a cross-sectional view taken along the line XV-XV of FIG. 6.
Figure 16:
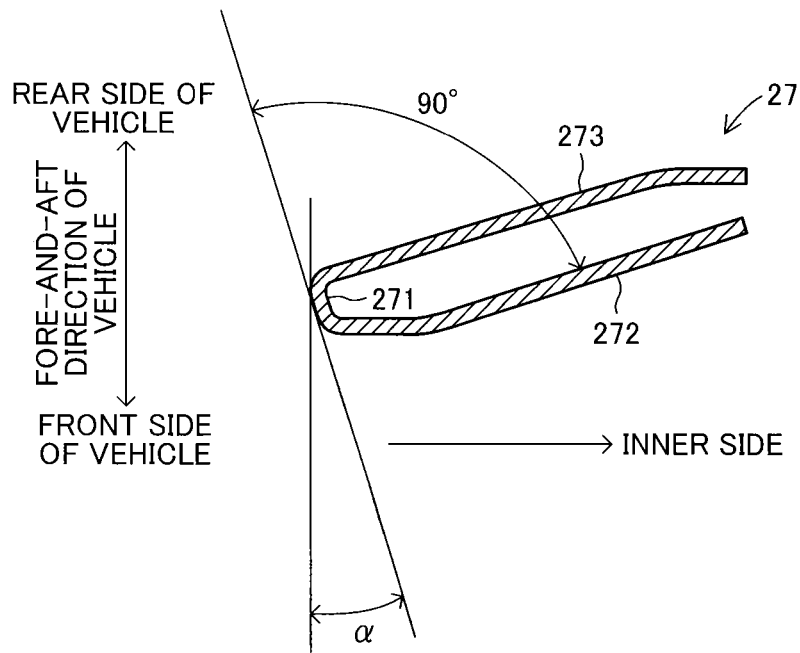
FIG. 16 is a cross-sectional view taken along the line XVI-XVI of FIG. 6.

FIGS. 8 to 16 are respectively a cross-sectional view (FIG. 8) taken along the line VIII-VIII of FIG. 6(b), a cross-sectional view (FIG. 9) taken along the line IX-IX of FIG. 6(b), a cross-sectional view (FIG. 10) taken along the line X-X of FIG. 6(b), a cross-sectional view (FIG. 11) taken along the line XI-XI of FIG. 6(b), a cross-sectional view (FIG. 12) taken along the line XII-XII of FIG. 6(b), a cross-sectional view (FIG. 13) taken along the line XIII-XIII of FIG. 6(b), a cross-sectional view (FIG. 14) taken along the line XIV-XIV of FIG. 6(b), a cross-sectional view (FIG. 15) taken along the line XV-XV of FIG. 6(b), and a cross-sectional view (FIG. 16) taken along the line XVI-XVI of FIG. 6(b). FIGS. 8 to 13 are cross-sectional views illustrating the upper portion of the seat back right-hand side member 21 in the longitudinal direction thereof. FIGS. 14 to 16 are cross-sectional views of the belt guide portion 27.

As illustrated in FIGS. 8 to 11, similarly to the center portion of the seat back right-hand side member 21 illustrated in FIG. 7, also the upper portion of the seat back right-hand side member 21 includes: the side member side wall portion 211 formed into a straight portion at substantially the center portion thereof in the fore-and-aft direction of the vehicle; the side member front wall portion 212 formed on the front side of the vehicle (lower side of FIG. 8, 9, 10, or 11) with respect to the side member side wall portion 211; and the side member rear wall portion 213 formed on the rear side of the vehicle (upper side of FIG. 8, 9, 10, or 11) with respect to the side member side wall portion 211. Further, the front projecting portion 212a is formed in the side member front wall portion 212, and the rear projecting portion 213a is formed in the side member rear wall portion 213. The front projecting portion 212a has the projecting amount larger than the projecting amount of the rear projecting portion 213a. Note that, the second recess 21d is formed in the seat back right-hand side member 21 at a position in cross-section illustrated in FIGS. 12 and 13, and hence the side member side wall portion 211, the front projecting portion 212a, and the rear projecting portion 213a are not shown in FIGS. 12 and 13.

Further, similarly to the side member side wall portion 211 illustrated in FIG. 7, the side member side wall portion 211 illustrated in FIGS. 8 to 11 is inclined at the angle α with respect to the fore-and-aft direction of the vehicle. The side member side wall portion 211 is formed continuously as illustrated in FIGS. 7 to 11. That is, a side wall, which is inclined at the angle α with respect to the fore-and-aft direction of the vehicle so as to be inclined inward from the outer side of the vehicle as extending from the rear side of the vehicle to the front side of the vehicle, is formed continuously in the seat back right-hand side member 21 along the longitudinal direction of the seat back right-hand side member 21.

Further, the front projecting portion 212a and the rear projecting portion 213a illustrated FIGS. 7 to 11 are formed continuously. That is, a ridge formed by the front projecting portion 212a is formed continuously on the front side of the vehicle with respect to the side member side wall portion 211 along the longitudinal direction of the seat back right-hand side member 21, and a ridge formed by the rear projecting portion 213a is formed continuously on the rear side of the vehicle with respect to the side member side wall portion 211 along the longitudinal direction of the seat back right-hand side member 21. The ridge formed on the front side of the vehicle with respect to the side member side wall portion 211 has a projecting amount larger than a projecting amount of the ridge formed on the rear side of the vehicle with respect to the side member side wall portion 211.

Further, as is apparent from FIGS. 14 to 16, the belt guide portion 27 includes: a belt guide side wall portion 271 having a surface inclined at the angle α with respect to the fore-and-aft direction of the vehicle; a belt guide front wall portion 272 extending from the front side of the vehicle with respect to the belt guide side wall portion 271 to the inner side of the seat back 40; and a belt guide rear wall portion 273 extending from the rear side of the vehicle with respect to the belt guide side wall portion 271 to the inner side of the seat back 40. The belt guide front wall portion 272 and the belt guide rear wall portion 273 are orthogonal to the fore-and-aft direction of the vehicle at positions illustrated in FIG. 14. However, at positions illustrated in FIGS. 15 and 16, that is, in the upper portion of the belt guide portion 27, the belt guide front wall portion 272 and the belt guide rear wall portion 273 obliquely cross the fore-and-aft direction of the vehicle at the angle α with respect to the fore-and-aft direction of the vehicle.

Note that, according to this embodiment, it is preferred that the side member side wall portion 211 formed in the seat back right-hand side member 21, and the belt guide side wall portion 271 formed in the belt guide portion 27 be formed on the same plane.

The above-mentioned angle α corresponds to an angle formed by the fore-and-aft direction of the vehicle and a direction of application of the tension of the seat belt 29 on the belt guide portion 27, the tension of the seat belt 29 being caused when the occupant held by the seat belt 29 is thrust to the front side of the vehicle by an inertial force at the time of sudden braking of the vehicle. In other words, a direction inclined at the angle α with respect to the fore-and-aft direction of the vehicle corresponds to the direction of application of the tension of the seat belt 29 on the belt guide portion 27.

According to this embodiment, the occupant is held by the seat belt 29. The seat belt 29 passes, via the belt guide portion 27 situated near a right shoulder of the occupant, the tongue plate fixed to the buckle 70 situated near a left lower back of the occupant. Therefore, the occupant is held by the seat belt that is slung from an upper right side to a lower left side of an upper part of his/her body. In a case where the seat belt 29 thus holding the occupant is pulled by the occupant to the front side of the vehicle, the seat belt 29 is pulled so as to extend obliquely with respect to the fore-and-aft direction of the vehicle when viewed from above. Accordingly, the direction of application of the tension of the seat belt 29 on the belt guide portion 27 is inclined with respect to the fore-and-aft direction of the vehicle. This inclination angle is represented by α in this embodiment.

Figure 17:
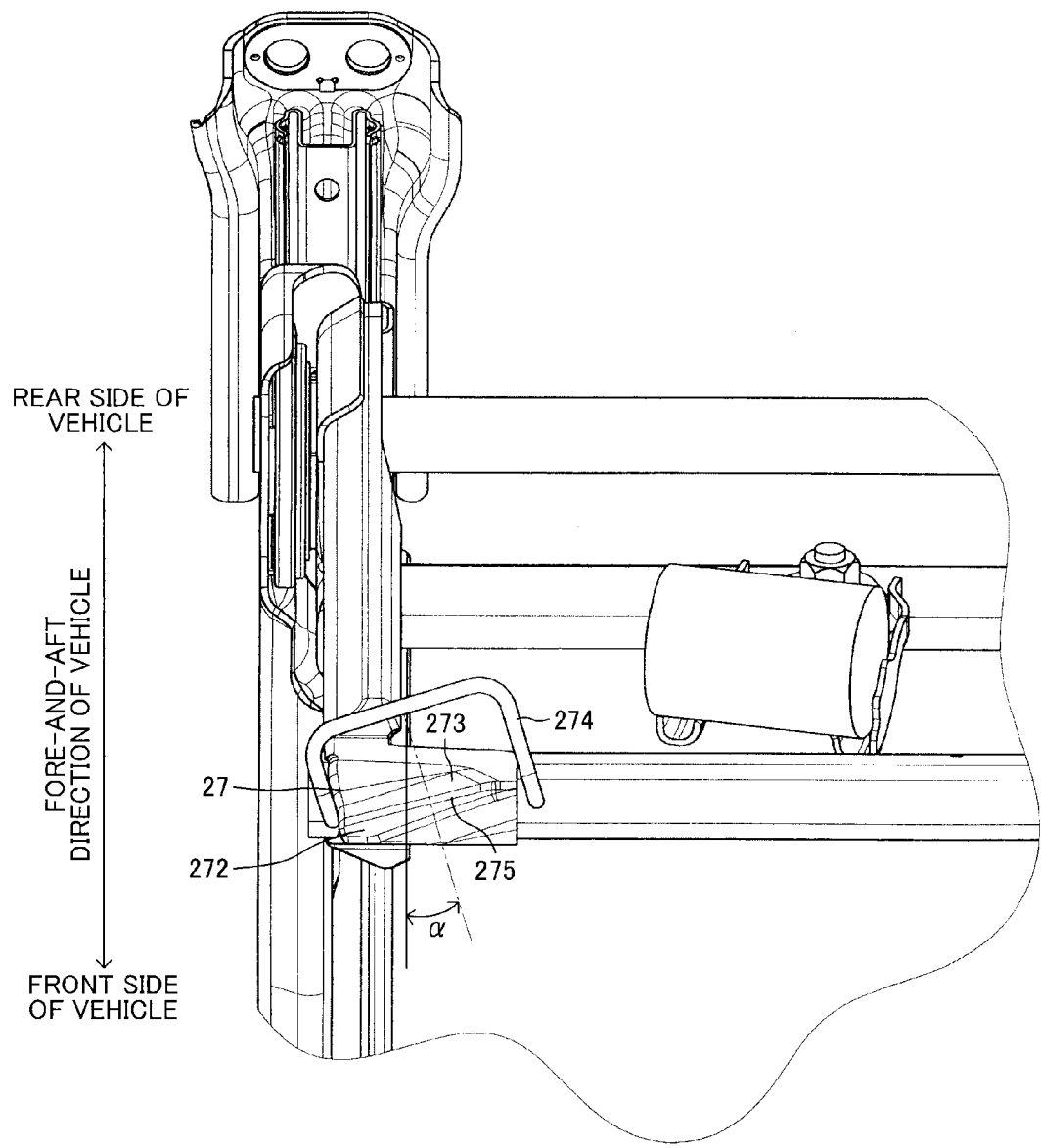
FIG. 17 is a top view of the belt guide portion.

FIG. 17 is a top view of the belt guide portion 27. As illustrated in FIG. 17, an extending direction of a crest portion 275 connecting between an upper end of the belt guide front wall portion 272 and an upper end of the belt guide rear wall portion 273 obliquely crosses the fore-and-aft direction of the vehicle at the angle α. Further, a guide frame 274 for allowing the seat belt to pass therethrough is fixed to the belt guide portion 27. A direction of the guide frame is inclined at the angle α with respect to the fore-and-aft direction of the vehicle.

Further, according to this embodiment, the seat back right-hand side member 21 and the belt guide portion 27 are integrally molded from one sheet of steel plate by a die quenching process. That is, one sheet of steel plate is pressed to integrally mold the seat back right-hand side member 21 and the belt guide portion 27, and after molding, dies and a molded product are held in contact with each other in a die assembly. Thus, the molded product is quenched. Through the quenching, the molded product is hardened. Then, after cooling, the molded product is taken out of the die assembly.

In the seat frame configured as described above, while the occupant seated on the seat is held by the seat belt 29, when, for example, the vehicle is braked suddenly, the occupant is thrust to the front side of the vehicle. Accordingly, the seat belt 29 is pulled, and thus the seat belt 29 generates the tension. The tension of the seat belt 29 is applied onto the belt guide portion 27 over which the seat belt 29 is hung, and the tension of the seat belt 29 is also applied on the seat back right-hand side member 21 to which the belt guide portion 27 is fixed. As described above, the direction of application of the tension of the seat belt 29 on the seat back right-hand side member 21 and the belt guide portion 27 is inclined at the angle α with respect to the fore-and-aft direction of the vehicle.

The seat back right-hand side member 21 according to this embodiment includes the side member side wall portion 211 that is inclined at the angle α with respect to the fore-and-aft direction of the vehicle. Further, also the belt guide portion 27 includes the belt guide side wall portion 271 that is inclined at the angle α with respect to the fore-and-aft direction of the vehicle. That is, the side wall portions 211, 271 are formed in parallel to the direction of application of the tension of the seat belt 29 on the belt guide portion 27. More specifically, the side wall portions 211, 271 are formed in parallel to the direction of application of the tension of the seat belt on the belt guide portion 29 and formed continuously along the longitudinal direction of the seat back right-hand side member 21 (that is, formed in parallel to the direction of application of the tension of the seat belt and to the longitudinal direction of the seat back right-hand side member 21). By virtue of this configuration, when the tension of the seat belt 29 is applied onto the belt guide portion 27, the side member side wall portion 211 and the belt guide side wall portion 271 effectively function as reinforcing portions against the tension, because the side member side wall portion 211 and the belt guide side wall portion 271 are provided parallel to the tension. As a result, the rigidity with respect to the tension of the seat belt 29 can be increased. Accordingly, it is possible to provide the seat frame in which rigidity with respect to the tension of the seat belt 29 is increased.

Further, the seat back right-hand side member 21 and the belt guide portion 27 are formed of one sheet of steel plate. Accordingly, the number of components is reduced, and thus it is possible to reduce a manufacturing cost of the seat frame.

Further, as is apparent from FIGS. 7 to 13, the seat back right-hand side member 21 has an open cross-sectional shape. In a case where the seat back right-hand side member 21 has a closed cross-sectional shape, it is necessary to superpose a plurality of sheets of steel plate and join the sheets of steel plate together by wending or the like. However, when the seat back right-hand side member 21 has an open cross-sectional shape, the seat back right-hand side member 21 can be processed using one sheet of steel plate. Therefore, man-hours for welding the plurality of sheets of steel plate are reduced. Accordingly, it is possible to further reduce the manufacturing cost of the seat frame.

Further, the front projecting portion 212a forms the ridge formed on the front side of the vehicle with respect to the side member side wall portion 211 along the longitudinal direction of the seat back right-hand side member 21. The ridge prevents the seat back right-hand side member 21 from buckling and deforming when the seat back right-hand side member 21 is pulled to the front side of the vehicle by the tension of the seat belt 29. Further, the rear projecting portion 213a forms the ridge formed on the rear side of the vehicle with respect to the side member side wall portion 211 along the longitudinal direction of the seat back right-hand side member 21. The ridge reinforces the seat back right-hand side member 21, and thus prevents the seat back right-hand side member 21 from buckling and deforming when the seat back right-hand side member 21 is pulled to the rear side of the vehicle.

Further, the front projecting portion 212a has the projecting amount larger than the projecting amount of the rear projecting portion 213a. Therefore, when the seat back right-hand side member 21 is pulled to the front side of the vehicle by the seat belt 29 with a large force, for example, at the time of sudden braking of the vehicle, the seat back right-hand side member 21 is more effectively prevented from buckling and deforming.

Further, also the belt guide portion 27 includes the belt guide side wall portion 271 formed in parallel to the direction of application of the tension of the seat belt 29 on the belt guide portion 27. Accordingly, against the tension of the seat belt, the belt guide side wall portion 271 effectively functions as a reinforcing portion. Thus, rigidity with respect to the tension of the seat belt is further increased.

Further, a portion of the belt guide front wall portion 272 and a portion of the belt guide rear wall portion 273 in the upper portion of the belt guide portion 27 are orthogonal to the direction of application of the tension of the seat belt 29 on the belt guide portion 27. Accordingly, when the seat belt 29 generates the tension while the seat belt 29 is hung over the belt guide portion 27, the seat belt 29 is prevented from slipping off. Thus, the tension of the seat belt 29 is correctly applied in the direction along the belt guide side wall portion 271 and the side member side wall portion 211.

Further, the seat back right-hand side member 21 and the belt guide portion 27 are integrally produced by die quenching, and hence it is possible to increase strength of the seat back right-hand side member 21 and the belt guide portion 27.

Further, the lower cross member 24 is set to have the vertical length larger than its widthwise length in cross-section. Accordingly, the first recess 21c, which is formed in the seat back right-hand side member 21 in order to fix the lower cross member 24, is formed into a vertically elongated shape. As described above, the first recess 21c can be formed into a vertically elongated shape, and thus an area of the recess formed in the seat back right-hand side member 21 is correspondingly reduced. Consequently, it is possible to prevent reduction in strength of the seat back right-hand side member that is accompanied with formation of the recess.

The invention claimed is:

1. A seat frame, comprising:
   a seat cushion frame for supporting a seat cushion of a seat of a vehicle; and a seat back frame to which a seat belt retaining member is coupled, the seat back frame
being coupled to the seat cushion frame and supporting a seat back of the seat, the seat belt
retaining member retaining one end of a seat belt for holding an occupant seated on the seat, the seat back frame comprising:
a first side member and a second side member each formed into an elongated shape along an up-and-down direction of the seat back so as to support each side portion of the seat back; and
a belt guide portion on which tension of the seat belt is applied when the seat belt is pulled, the belt guide portion being formed in an upper portion of the first side member and guiding the seat belt having the one end retained by the seat belt retaining member,
the first side member being formed of one sheet of steel plate and comprising:
a side member side wall portion formed in parallel to a direction of application of the tension of the seat belt on the belt guide portion and formed continuously along a longitudinal direction of the first side member;
a side member front wall portion formed on a front side of the vehicle with respect to the side member side wall portion; and
a side member rear wall portion formed on a rear side of the vehicle with respect to the side member side wall portion,
the first side member having an open cross-sectional shape, wherein
the side member front wall portion comprises a front projecting portion projecting to an outer side of the seat back with respect to the side member side wall portion;
the side member rear wall portion comprises a rear projecting portion projecting to the outer side of the seat back with respect to the side member side wall portion;
the front projecting portion and the rear projecting portion are formed continuously along the longitudinal direction of the first side member; and
the front projecting portion has a projecting amount larger than a projecting amount of the rear projecting portion.

2. A seat frame according to claim 1, wherein the belt guide portion comprises:
a belt guide side wall portion formed in parallel to the direction of application of the tension of the seat belt on the belt guide portion;
a belt guide front wall portion formed on the front side of the vehicle with respect to the belt guide side wall portion so as to extend to an inner side of the seat back; and
a belt guide rear wall portion formed on the rear side of the vehicle with respect to the belt guide side wall portion so as to extend to the inner side of the seat back.

3. A seat frame according to claim 2, wherein the belt guide front wall portion and the belt guide rear wall portion each comprise a portion orthogonal to the direction of application of the tension of the seat belt on the belt guide portion.

4. A seat frame according to claim 1, wherein the first side member is produced by die quenching.

5. A seat frame according to claim 1, wherein:
the seat back frame comprises a cross member for coupling the first side member and the second side member together; and
the cross member is set to have a vertical length larger than a widthwise length thereof in cross-section.

6. A seat frame, comprising:
a seat cushion frame for supporting a seat cushion of a seat of a vehicle; and
a seat back frame to which a seat belt retaining member is coupled, the seat back frame being coupled to the seat cushion frame and supporting a seat back of the seat, the seat belt retaining member retaining one end of a seat belt for holding an occupant seated on the seat,
the seat back frame comprising:
a first side member and a second side member each formed into an elongated shape along an up-and-down direction of the seat back so as to support each side portion of the seat back; and
a belt guide portion on which tension of the seat belt is applied when the seat belt is pulled, the belt guide portion being formed in an upper portion of the first side member and guiding the seat belt having the one end retained by the seat belt retaining member,
the first side member being formed of one sheet of steel plate and comprising:
a side member side wall portion formed so as to be inclined with respect to a fore-and-aft direction of the vehicle and formed continuously along a longitudinal direction of the first side member;
a side member front wall portion formed on a front side of the vehicle with respect to the side member side wall portion; and
a side member rear wall portion formed on a rear side of the vehicle with respect to the side member side wall portion,
the first side member having an open cross-sectional shape, wherein
the side member front wall portion comprises a front projecting portion projecting to an outer side of the seat back with respect to the side member side wall portion;
the side member rear wall portion comprises a rear projecting portion projecting to the outer side of the seat back with respect to the side member side wall portion;
the front projecting portion and the rear projecting portion are formed continuously along the longitudinal direction of the first side member; and
the front projecting portion has a projecting amount larger than a projecting amount of the rear projecting portion.

7. A seat frame according to claim 6, wherein the side member side wall portion is inclined inward from an outer side of the vehicle as extending from the rear side of the vehicle to the front side of the vehicle.

8. A seat frame according to claim 7, wherein a direction of inclination of the side member side wall portion is parallel to the direction of application of the tension of the seat belt on the belt guide portion.

9. A seat frame, comprising:
a seat cushion frame for supporting a seat cushion of a seat of a vehicle; and
a seat back frame to which a seat belt retaining member is coupled, the seat back frame
being coupled to the seat cushion frame and supporting a seat back of the seat, the seat belt
retaining member retaining one end of a seat belt for holding an occupant seated on the seat, the seat back frame comprising:
a first side member and a second side member each formed into an elongated shape along an up-and-down direction of the seat back so as to support each side portion of the seat back; and
a belt guide portion on which tension of the seat belt is applied when the seat belt is pulled, the belt guide portion being formed in an upper portion of the first side member and guiding the seat belt having the one end retained by the seat belt retaining member, wherein the first side member is formed of one sheet of steel plate and comprises:
- a side member side wall portion formed in parallel to a direction of application of the tension of the seat belt on the belt guide portion and formed continuously along a longitudinal direction of the first side member;
- a side member front wall portion formed on a front side of the vehicle with respect to the side member side wall portion; and
- a side member rear wall portion formed on a rear side of the vehicle with respect to the side member side wall portion, wherein the first side member has an open cross-sectional shape, and wherein the belt guide portion comprises:
- a belt guide side wall portion formed in parallel to the direction of application of the tension of the seat belt on the belt guide portion;
- a belt guide front wall portion formed on the front side of the vehicle with respect to the belt guide side wall portion so as to extend to an inner side of the seat back; and
- a belt guide rear wall portion formed on the rear side of the vehicle with respect to the belt guide side wall portion so as to extend to the inner side of the seat back.

10. A seat frame according to claim 9, wherein the belt guide front wall portion and the belt guide rear wall portion each comprise a portion orthogonal to the direction of application of the tension of the seat belt on the belt guide portion.

* * * * *